Oct. 14, 1958 F. LEISTER 2,856,245
BEARING MOUNTING
Filed Oct. 19, 1953

INVENTOR.
Fayette Leister
ATTORNEYS

United States Patent Office 2,856,245
Patented Oct. 14, 1958

2,856,245
BEARING MOUNTING

Fayette Leister, New Britain, Conn., assignor to The Fafnir Bearing Company, New Britain, Conn., a corporation of Connecticut Application October 19, 1953, Serial No. 386,901

3 Claims. (Cl. 308—187)

My invention relates to a bearing mounting and more particularly to a flange mounting having improved means for lubricating the bearing.

It is an object of the invention to provide improved means for lubricating a bearing of the character set forth.

In the drawings, which show, for illustrative purposes only, preferred forms of the invention—

Figure 1:
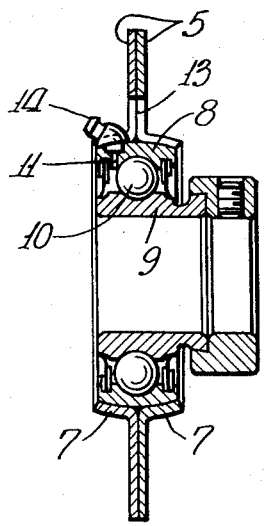
Fig. 1 is a central vertical section through a bearing and mounting, illustrating one form of the invention.
Figure 2:
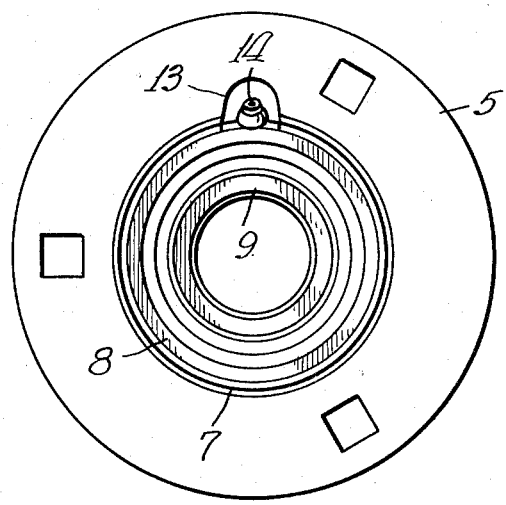
Fig. 2 is a view in left-hand elevation of the parts shown in Fig. 1.

In that form shown in Fig. 1, the bearing mounting includes a pair of disc flanges 5—5 to be arranged in face to face relationship and to be secured to a support. The disc flanges 5 are provided with apertures to receive fastening means to secure the entire mounting to a wall or other support. The openings in at least one of the plates may be angular, as shown in Fig. 2, to receive the angular shanks of carriage bolts, as will be understood. The housing portion proper is formed integrally with the flange plates 5—5, and in the form shown, the flange plates 5 are provided with generally axially extending circumferential flanges 7 extending oppositely to each other, as illustrated in Fig. 1. These housing flanges 7—7 are preferably formed on the inside so as to present a generally spherical surface to receive a corresponding surface on the outer ring 8 of a ball bearing, which bearing may consist of said outer ring 8, an inner ring 9, and interposed antifriction bearing members such as balls 10.

The outer bearing ring 8 is provided with a lubrication passage 11 extending from the outer generally spherical surface thereof to the interior of the bearing, so as to admit lubricant from the outside to the interior of the bearing. One of the flange parts 7, in this case the one at the left in Fig. 1, is provided with a substantial notch or aperture 13 and preferably the adjacent disc flange 5 is provided with a connecting notch so that the two apertures or notches together form a substantial passage or aperture to make room for a lubricant fitting 14. This lubricant fitting 14 is preferably pressed or screwed into the counterbore communicating with the lubricant passage 11, as will be understood. Since the housing plates 5—7 are preferably duplicates of each other, the plate at the right in Fig. 1 may be apertured or recessed, the same as the left-hand plate, so that the lubricant fitting could be placed at either side of the housing. Thus, it will be seen that the bearing will be adequately supported in the housing and the lubricant fitting may be applied directly to the bearing without substantially weakening any part of the housing.

Figure 3:
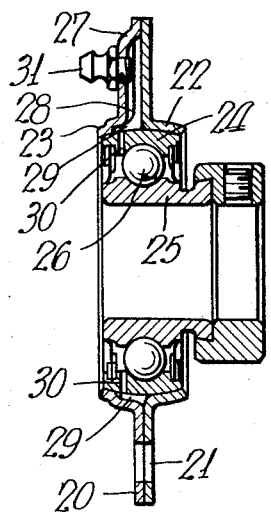
Fig. 3 is a view similar to Fig. 1, but illustrating a modification.
Figure 4:
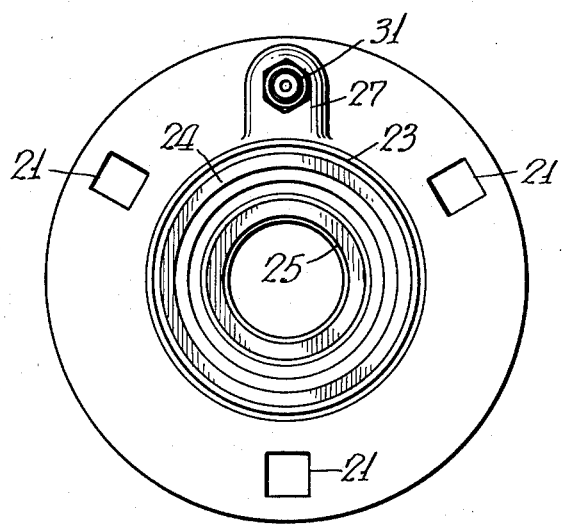
Fig. 4 is a left-hand view in elevation of the parts shown in Fig. 3.

In that form shown in Figs. 3 and 4, I employ disc flanges 20 which are designed to abut face to face as in the previous form, and these flanges are provided with apertures 21 similar to those heretofore described for securing the entire housing to a support. Each of the flange plates 20 is provided with an outwardly generally axially extending circumferential housing flange 22—23 and these flanges at the inner side are preferably formed so as to be of more or less spherical shape to receive a correspondingly shaped outer bearing ring 24 of an antifriction bearing. The bearing may consist of said outer ring 24, an inner ring 25 and antifriction bearing members such as balls 26.

One of the flanges is provided with a bowed out portion 27 so as to space a part of the inner wall slightly away from the face of the adjacent flange. This bowed out portion constitutes a lubricant passage 28 which extends down substantially to the outer surface of the outer ring 24. One of the flanges 22—23 and, in this case, the flange 23 is provided with a circumferentially extending groove or channel 29 which extends all or part way about the flange 23 and, of course, communicates with the lubricant channel 28. The outer ring 24 is provided with one or more radial passages 30 communicating with the circumferential passage 29 so that lubricant introduced into the passage 28 may flow about the circumferential passage 29 and into the one or more lubricant passages 30 through the bearing ring. If desired, a lubricant fitting 31 may be secured to the left-hand flange plate over the bulge therein, so as to facilitate the application of lubricant to the bearing.

It will thus be seen that I have provided a bearing mounting formed of pressed metal or the like which is very sturdy in construction, yet cheap to manufacture, and I have provided improved means to permit lubricating means to be applied directly to the bearing itself or to the housing.

While the invention has been described in considerable detail and preferred forms illustrated, it is to be understood that various changes and modifications may be made within the scope of the invention as defined in the appended claims.

I claim:

1. A bearing mounting, including a flange fitting to be secured to a support, circumferentially extending generally axial flanges extending from said flange fitting in opposite directions forming a housing for a bearing, a bearing in said housing, said axial flanges having substantial apertures therein, said bearing having an opening communicating with the interior thereof and registering with said apertures in said flanges, and a lubricant fitting carried by said bearing and located in one of said apertures.

2. In a bearing mounting, disc means to be secured to a support, generally axial flange means extending in opposite directions from said disc means and forming a housing for an antifriction bearing, a bearing in said housing, a lubricant fitting in the outer ring of said bearing, said disc means and said axial flange means having registering cut away portions to house said lubricant fitting and give access thereto from both sides of said disc means.

3. In a bearing mounting, a pair of discs in face to face relationship, generally axially and oppositely extending flanges on said discs and forming a housing for a bearing, a bearing in said housing, at least one of said generally axially extending flanges having an opening, a lubricant fitting secured to said bearing and located in and accessible through said opening.

References Cited in the file of this patent

UNITED STATES PATENTS

| | | |
|---|---|---|
| Re. 21,415 | Martinet et al. | Apr. 2, 1940 |
| 1,606,747 | Carter | Nov. 16, 1926 |
| 1,706,045 | Thoen | Mar. 19, 1929 |
| 2,083,688 | Clements | June 15, 1937 |
| 2,451,115 | Pew | Oct. 12, 1948 |
| 2,653,064 | Heim | Sept. 22, 1953 |

FOREIGN PATENTS

| | | |
|---|---|---|
| 562,391 | Great Britain | June 29, 1944 |